US009016709B1

(12) United States Patent
McMunn

(10) Patent No.: US 9,016,709 B1
(45) Date of Patent: Apr. 28, 2015

(54) STEERABLE AND COLLAPSIBLE TRAILER FOR USE WITH A MOTORCYCLE

(71) Applicant: Clayton Wilford Russell McMunn, Coquitlam (CA)

(72) Inventor: Clayton Wilford Russell McMunn, Coquitlam (CA)

( * ) Notice: Subject to any disclaimer, the term of this patent is extended or adjusted under 35 U.S.C. 154(b) by 0 days.

(21) Appl. No.: 14/163,061

(22) Filed: Jan. 24, 2014

(51) Int. Cl.
*B62D 13/02* (2006.01)
*B62K 27/00* (2006.01)
*B62D 63/06* (2006.01)

(52) U.S. Cl.
CPC ............ *B62D 13/025* (2013.01); *B62K 27/006* (2013.01); *B62D 63/061* (2013.01)

(58) Field of Classification Search
CPC .. B62K 27/006; B62D 63/067; B62D 63/061; B62D 13/025
USPC .......................................... 280/444, 442, 204
See application file for complete search history.

(56) References Cited

U.S. PATENT DOCUMENTS

| | | | | |
|---|---|---|---|---|
| 3,387,859 A | * | 6/1968 | Mcclellan | 280/204 |
| 3,937,489 A | * | 2/1976 | Hawes et al. | 280/204 |
| D281,312 S | * | 11/1985 | Russell | D12/101 |
| 4,756,541 A | * | 7/1988 | Albitre | 280/204 |
| 5,427,396 A | * | 6/1995 | Gore | 280/204 |
| 5,984,342 A | * | 11/1999 | Ysker | 280/492 |
| 6,042,138 A | | 3/2000 | Shreck | |
| 6,428,035 B1 | * | 8/2002 | Maxwell et al. | 280/656 |
| D523,779 S | * | 6/2006 | Mattila | D12/101 |
| 7,121,575 B2 | * | 10/2006 | Finch | 280/489 |
| 7,543,842 B1 | * | 6/2009 | Fiorini | 280/656 |
| 7,744,111 B2 | | 6/2010 | Anderson | |
| 7,850,185 B2 | * | 12/2010 | Weng et al. | 280/204 |
| 8,870,210 B2 | * | 10/2014 | Smith | 280/444 |
| 2007/0001431 A1 | * | 1/2007 | Fiorini | 280/656 |
| 2007/0018429 A1 | * | 1/2007 | Randall | 280/491.1 |
| 2008/0073871 A1 | * | 3/2008 | Winkel | 280/415.1 |

* cited by examiner

*Primary Examiner* — Joseph Rocca
*Assistant Examiner* — Michael Stabley
(74) *Attorney, Agent, or Firm* — Ryan W. Dupuis; Kyle R. Satterthwaite; Ade & Company Inc.

(57) ABSTRACT

A trailer for use behind a motorcycle has an elongate frame which is suitable for carrying elongate cargo items thereon. To accommodate the elongate configuration of the frame, the frame is foldable for collapsing in length for storage, and the frame includes a steerable wheel to better track the motorcycle. The steerable wheel is located at the rear of the frame and is laterally centered relative to a steering axis of the wheel. Articulation of a hitching arm of the trailer relative to the frame of the trailer serves as an input to guide steering of the single wheel of the trailer relative to the frame of the trailer.

17 Claims, 10 Drawing Sheets

STEERABLE AND COLLAPSIBLE TRAILER FOR USE WITH A MOTORCYCLE

FIELD OF THE INVENTION

The present invention relates to a trailer for use behind a motorcycle to track and lean with the motorcycle as the motorcycle moves in a forward travel direction, and more particularly the present invention relates to a trailer which may include a steerable wheel and which may be foldable for collapsing the overall length thereof in storage so as to be suitable for carrying elongate cargo items thereon.

BACKGROUND

A growing number of outdoor enthusiasts are using motorcycles as primary transportation during the warmer season, but are forced to use a full sized vehicle to transport their recreational equipment. Motorcycle trailers which exist on the market today are too short to support the length of these items, and they are not equipped to secure the equipment safely. Examples of typical trailers for towing behind a motorcycle are disclosed in U.S. Pat. No. 6,042,138 by Shreck and U.S. Pat. No. 7,744,111 by Anderson. These examples however are not suited for use in an extended form due to the difficulty of maneuvering them behind a motorcycle, combined with the nuisance of storing such a trailer when not in use. Accordingly, there exists a need for a trailer for use with a motorcycle which can accommodate large recreational items, including surfboards, kayaks, bicycles, and the like.

SUMMARY OF THE INVENTION

According to one aspect of the invention there is provided a trailer for use with a motorcycle to track and lean with the motorcycle as the motorcycle is displaced in a forward travel direction, the trailer comprising:

a trailer frame which is elongate in a longitudinal direction between a front end and a rear end of the trailer frame;

a hitch arm extending between a first end arranged to be coupled to the motorcycle and a second end pivotally coupled to the front end of the trailer frame for pivotal movement of the hitch arm relative to the trailer frame about an upright input axis;

a trailer wheel;

a trailer hub supporting the trailer wheel thereon for rotation about a horizontal rolling axis oriented in a lateral direction, the trailer hub being pivotally coupled to the rear end of the trailer frame for pivotal movement of the trailer hub and the trailer wheel supported thereon relative to the trailer frame about an upright steering axis which is centered in said lateral direction relative to the trailer wheel; and a steering mechanism operatively connected to the hitch arm and the trailer hub so as to be arranged to pivot the trailer hub relative to the trailer frame responsive to pivotal movement of the trailer frame relative to the hitch arm.

The novel motorcycle trailer design according to the present invention incorporates a long frame to accommodate lengthy items, and it is fitted with a single rear wheel to remain within the width envelope of the motorbike. To address the maneuverability issue of towing a longer trailer, the single rear wheel is fitted with a hub-center steering mechanism which allows the trailer to follow the same path as the motorcycle, eliminating the need to 'swing wide' around corners and obstacles. The steering movement is controlled by a change in articulative relationship between the trailer and the motorcycle. The combined safety of a narrow profile and rear wheel steering will allow the motorcyclist to fully concentrate on the road, rather than the path of the trailer.

When the trailer wheel comprises a rim portion supported on the trailer hub and a tire portion supported on the rim portion, preferably the upright steering axis is centered in the lateral direction relative to the tire portion. In this instance, the rim portion may be laterally offset relative to the upright steering axis so as to be arranged to locate a pivotal connection of the trailer hub to the trailer frame within the tire portion.

Preferably the steering mechanism further comprises an input crank fixed relative to the hitch arm adjacent to the input axis, an output crank fixed relative to the trailer hub adjacent to the output axis, and a linkage coupled between the input crank and the output crank. The linkage may comprise a hydraulic linkage.

The output crank may be located within the trailer wheel.

A length of the input crank between the input axis and a pivotal connection to the linkage may be substantially equal to a length of the output crank between the steering axis and a pivotal connection to the linkage.

When the hitch arm is pivotal about the steering axis from a working position extending forwardly from the input axis for connection to the motorcycle to a storage position extending rearwardly from the input axis in overlapping arrangement with the trailer frame, preferably the input crank is rotated over-centre relative to the linkage between the working position and the storage position.

When the trailer frame is foldable about a hinge axis at an intermediate location between the front and rear ends between a working position and a storage position in which an overall length of the trailer frame is reduced relative to the working position.

Preferably the hinge axis is oriented horizontally in said lateral direction and is centrally located between the front end and the rear end of the trailer frame.

Preferably the trailer frame comprises at least one longitudinal frame member having a front section and a rear section pivotally coupled at the hinge axis, in which the hinge axis is substantially below said at least one longitudinal frame member. In this instance, a rear end of the front section and a front end of the rear section may be arranged to abut in the working position so as to prevent pivoting of the front section relative to the rear section from the storage position beyond the working position.

The steering mechanism is preferably arranged to be foldable about the hinge axis together with the trailer frame while in an operative condition.

The trailer frame may further comprise a main portion, a suspension arm portion pivotally coupled to a rear end of the main portion for relative pivotal movement about a horizontal suspension axis, and a suspension assembly coupled between the main portion and the suspension arm portion to bias the suspension arm portion from an angularly deflected position to a normal working position extending generally rearward from the main portion. In this instance, the trailer hub is supported on the suspension arm portion for pivotal movement about the upright steering axis.

When used in combination with the motorcycle, preferably said trailer wheel comprises the only wheel of the trailer and the trailer wheel is supported to track respective wheels of the motorcycle.

According to a second aspect of the present invention there is provided a trailer for use with a motorcycle to track and lean with the motorcycle as the motorcycle is displaced in a forward travel direction, the trailer comprising:

a trailer frame which is elongate in a longitudinal direction between a front end and a rear end of the trailer frame;

a hitch arm extending between a first end arranged to be coupled to the motorcycle and a second end coupled to the front end of the trailer frame;

a trailer wheel; and a trailer hub supporting the trailer wheel thereon for rotation about a horizontal rolling axis oriented in a lateral direction, the trailer hub being coupled to the trailer frame in proximity to the rear end thereof;

the trailer frame being foldable about a hinge axis at an intermediate location between the front and rear ends between a working position and a storage position in which an overall length of the trailer frame is reduced relative to the working position.

For easy storage, the elongated frame is designed to fold up into a fraction of the size in a few seconds, with one single motion. The geometry of the steering system is configured to align the trailer wheel in the 'straight' position once the frame is folded, allowing the user to roll the unit along the ground effortlessly in the stowed position.

For additional stability, and to protect the trailer's cargo from impact owing to road irregularities, a spring/damper suspension system is used to couple the rear-wheel control arm to the frame of the trailer.

To reduce the wear on the motorcycle brakes, and to increase vehicle stability when slowing heavy loads, the trailer wheel is equipped with a disk brake that is activated by inertial force between the motorcycle and trailer during deceleration. Hydraulic brake pressure is obtained from a master cylinder fixed to a lever mechanism on the front of the trailer hitch.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
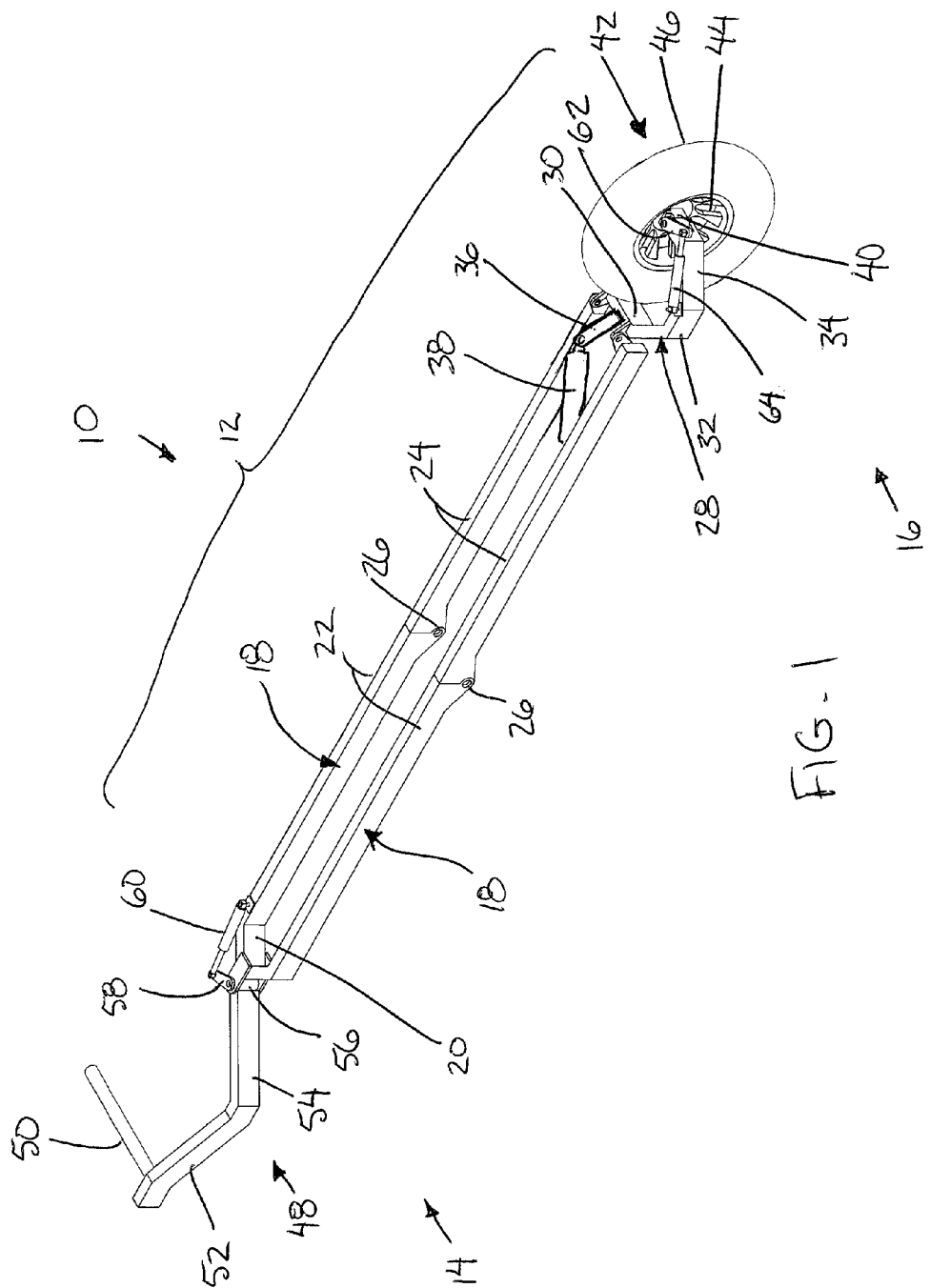
FIG. 1 is a perspective view of the trailer in a working position.
Figure 2:
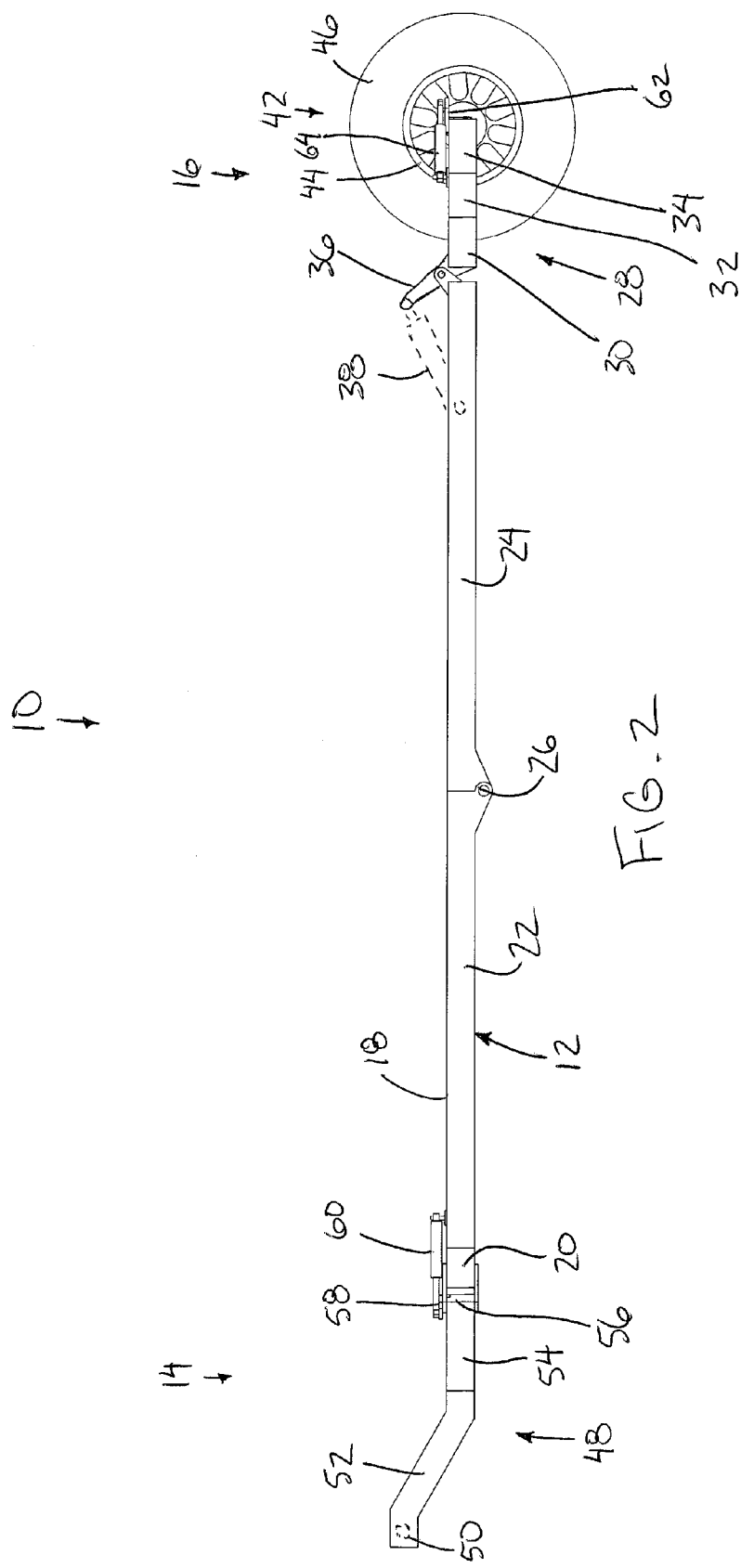
FIG. 2 is a side elevational view of the trailer.
Figure 3:
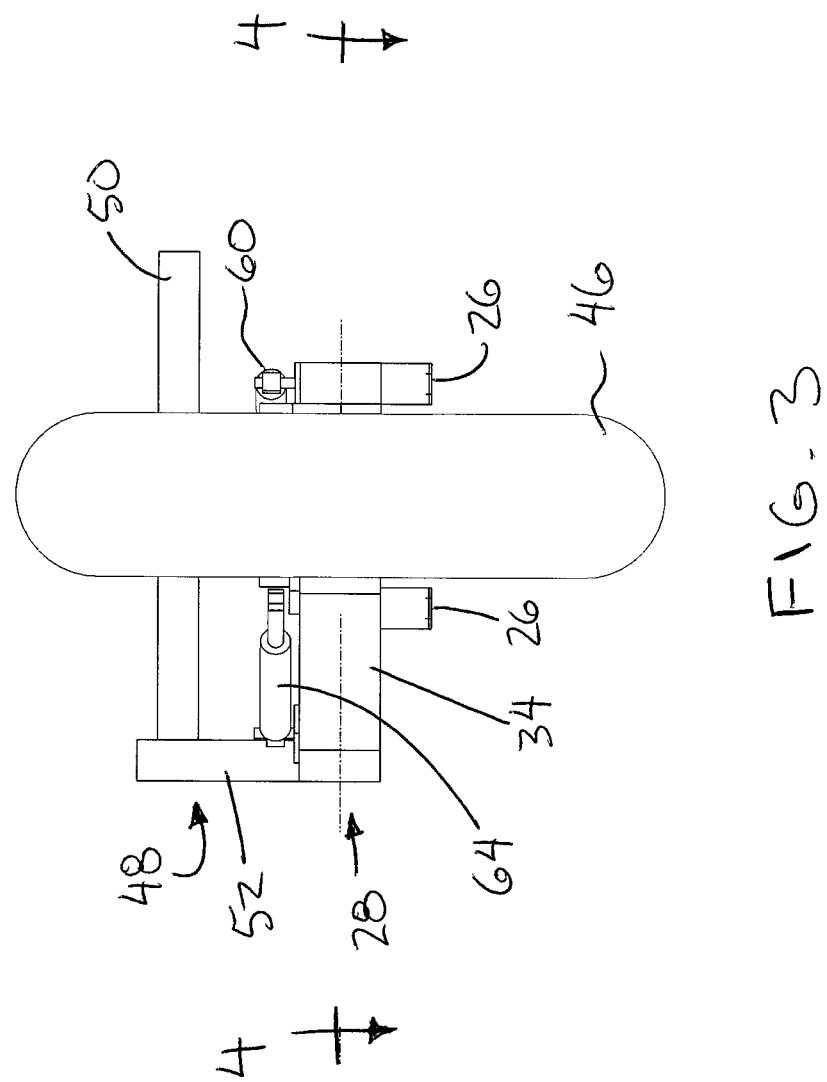
FIG. 3 is a rear elevational view of the trailer.
Figure 4:
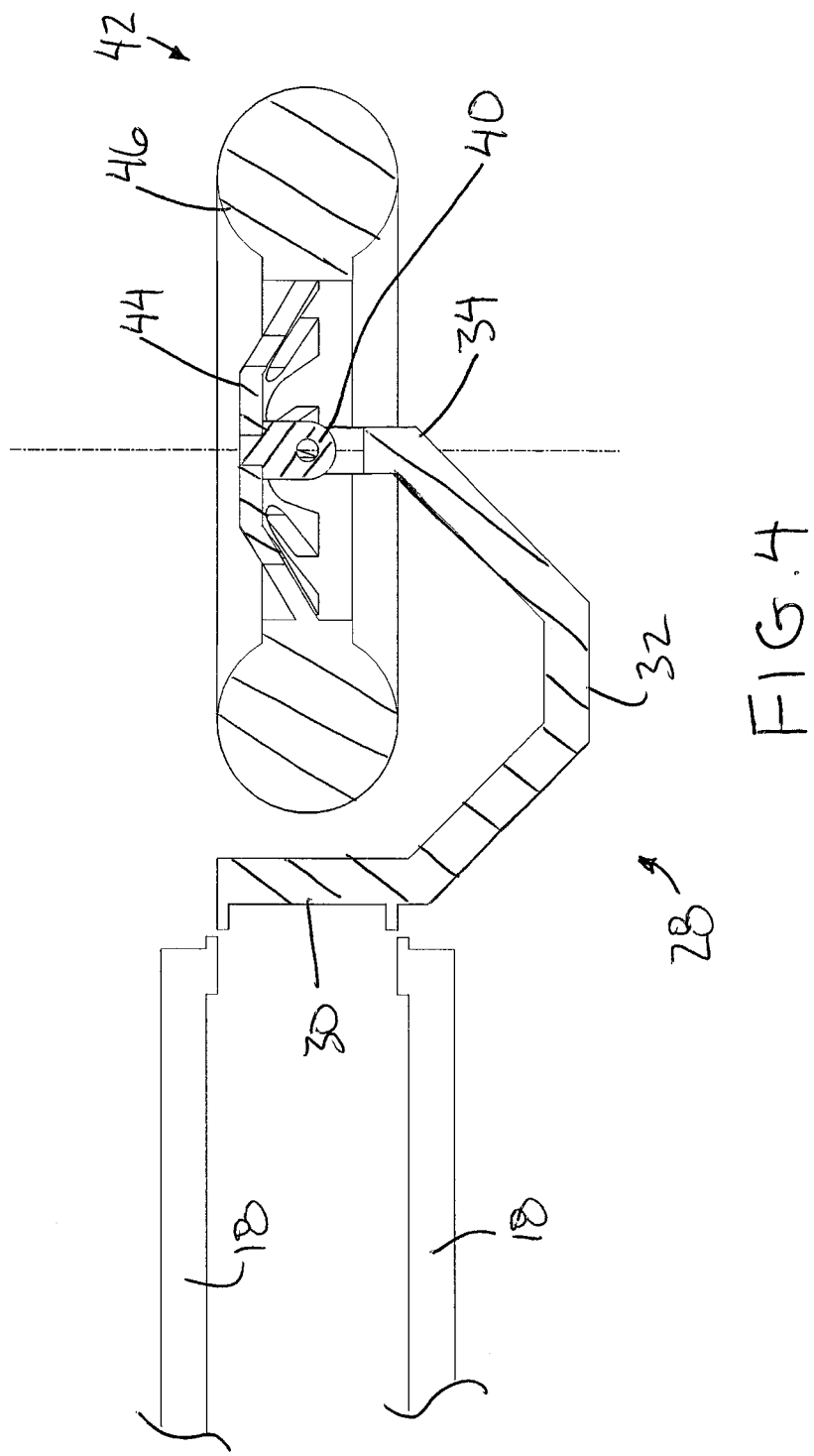
FIG. 4 is a sectional view of the trailer along the line 4-4 of FIG. 3.
Figure 5:
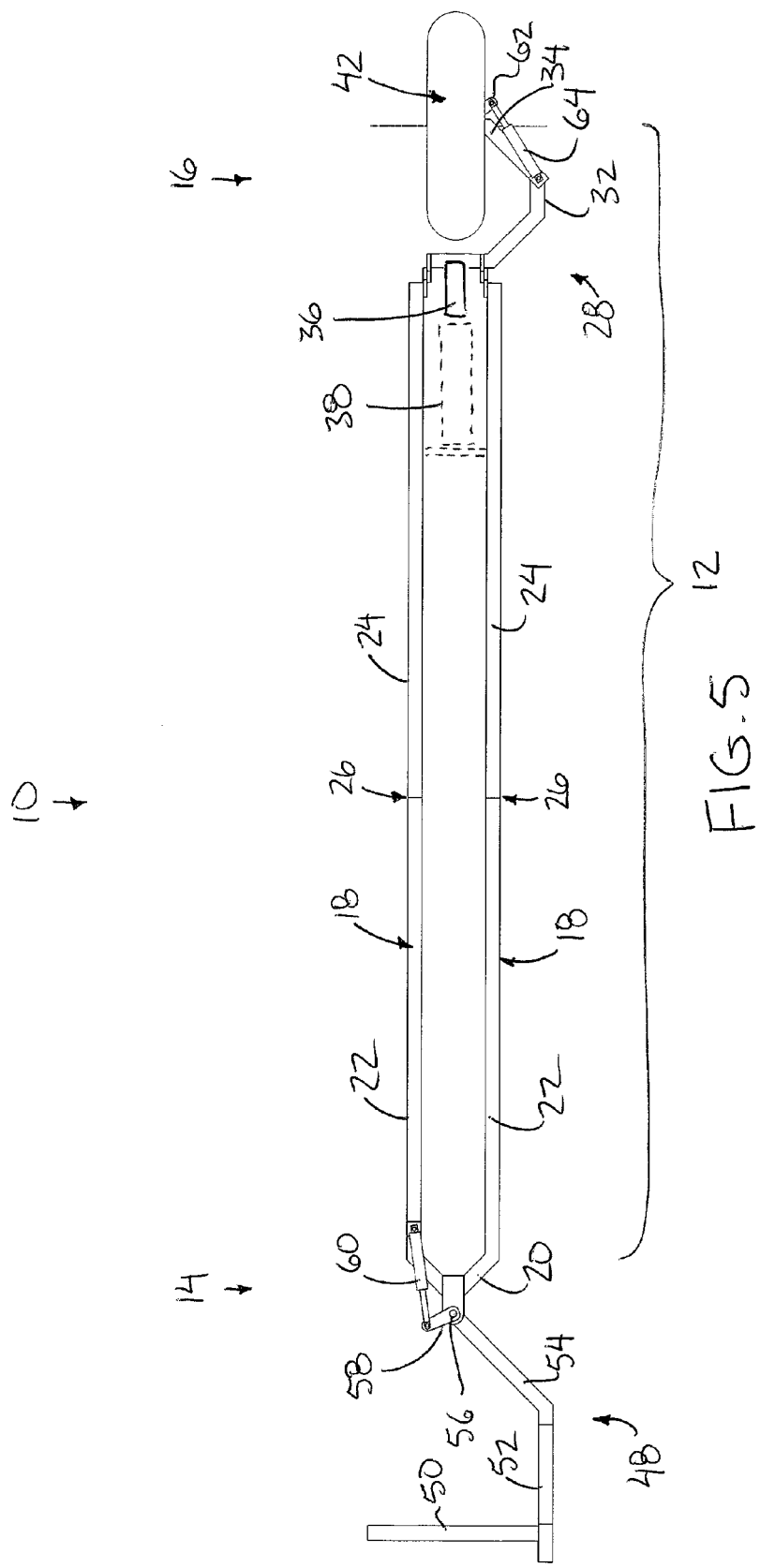
FIG. 5 is a top plan view of the trailer in a straight orientation of the trailer wheel.
Figure 6:
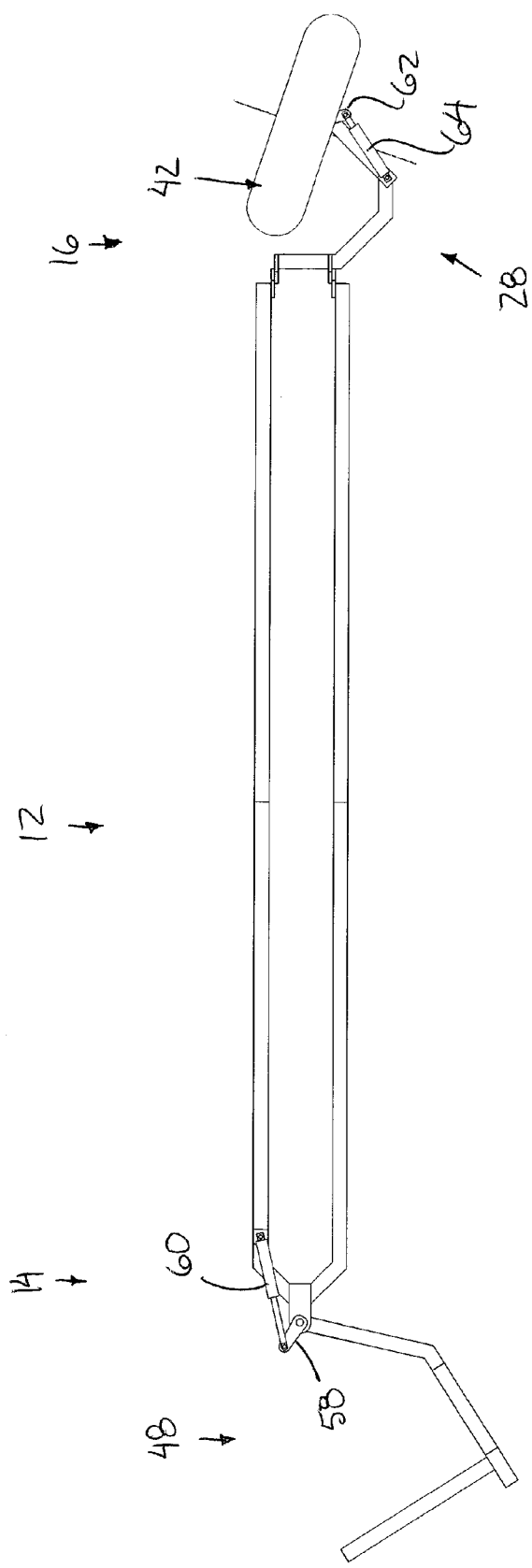
FIG. 6 is a top plan view of the trailer in a right steering orientation of the trailer wheel responsive to a left steering orientation of the motorcycle.
Figure 7:
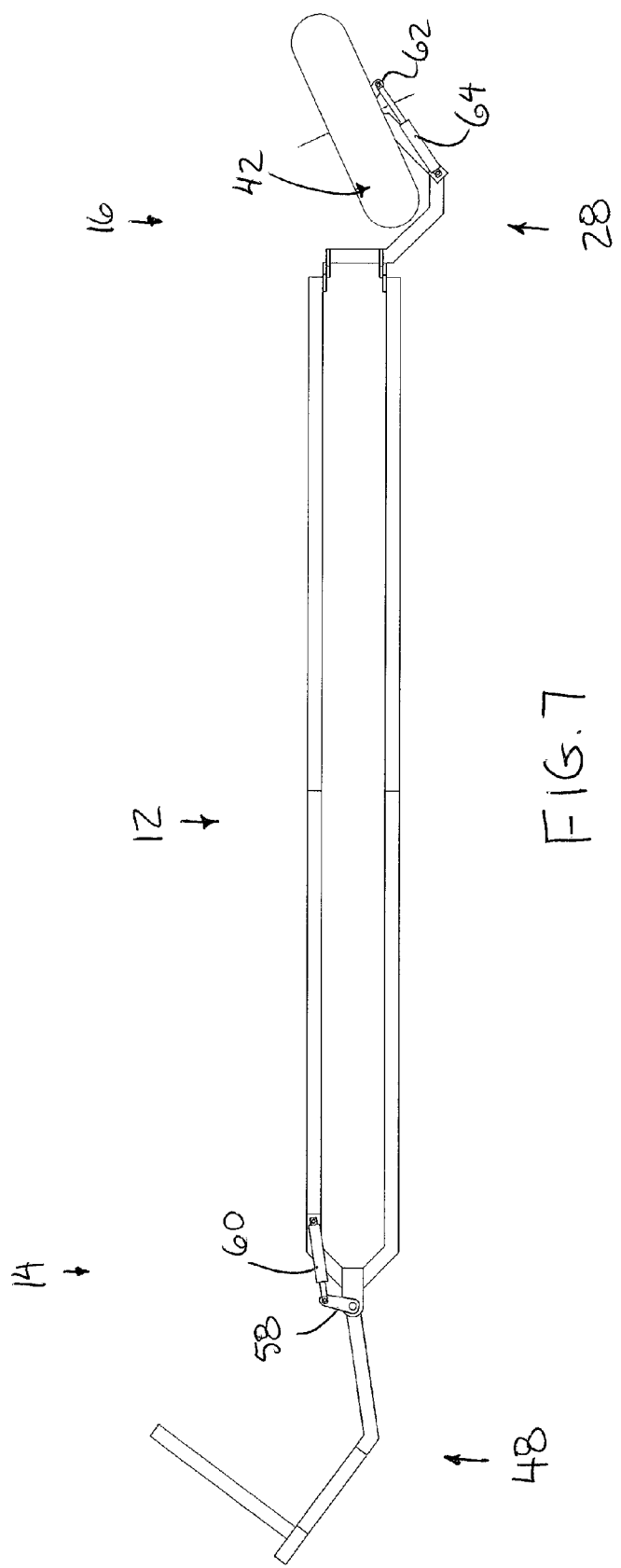
FIG. 7 is a top plan view of the trailer in a left steering orientation of the trailer wheel respective to a right steering orientation of the motorcycle.
Figure 8:
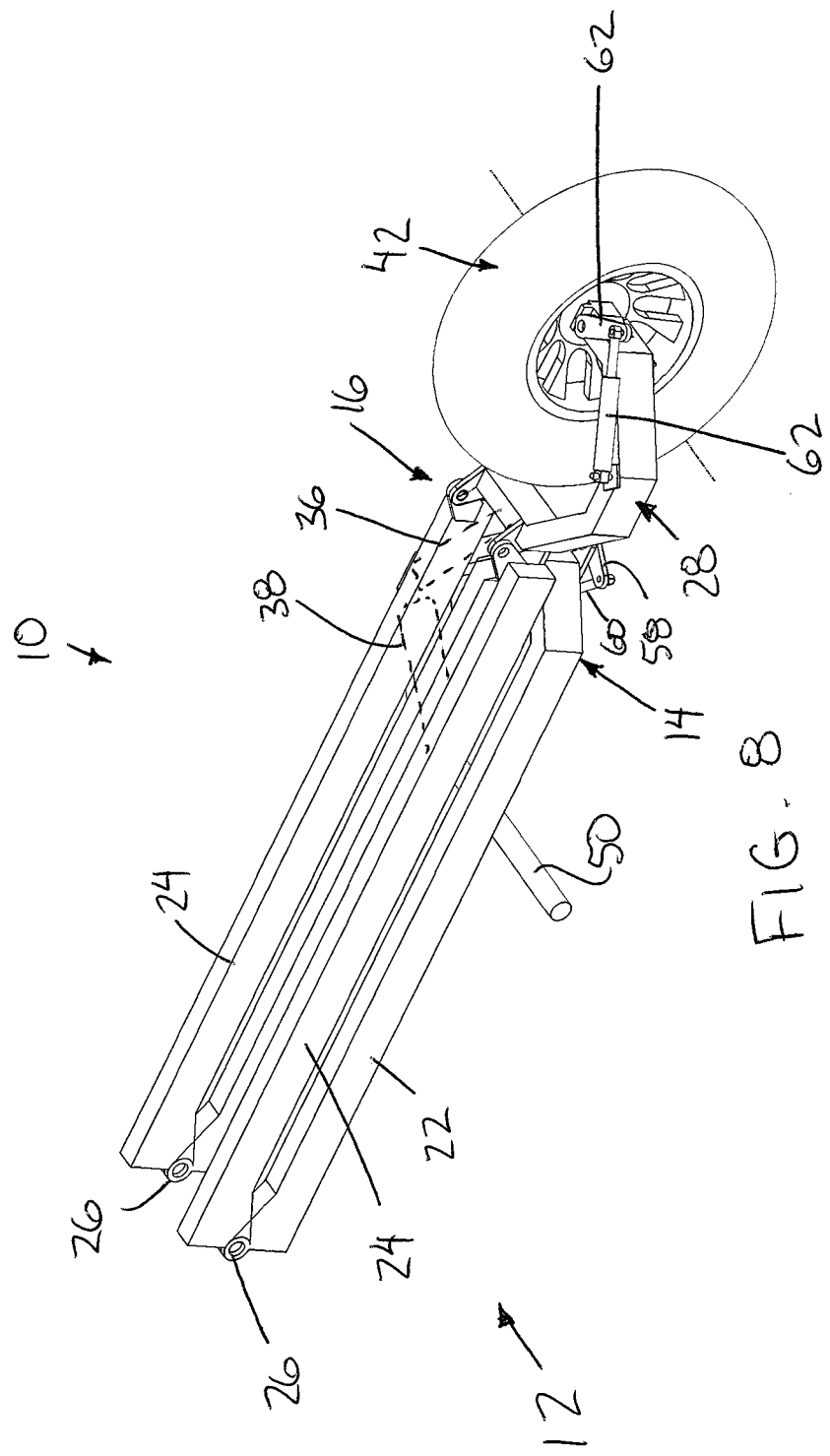
FIG. 8 is a perspective view of the trailer in a storage position.
Figure 9:
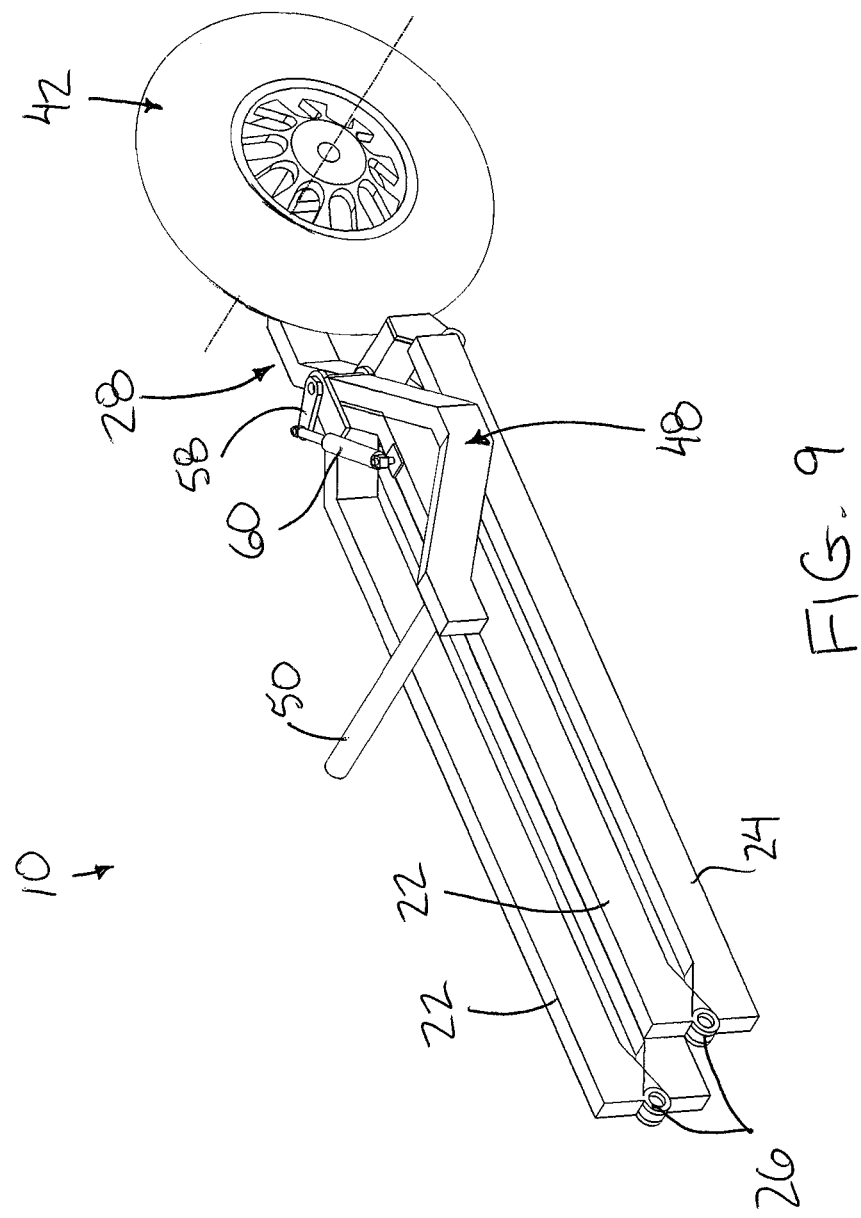
FIG. 9 is an alternative perspective view of the trailer further illustrating the hitch arm in the storage position.

Referring to the accompanying figures, there is illustrated a motorcycle trailer generally indicated by reference numeral 10. The trailer 10 is particularly suited for towing behind a two-wheeled vehicle 5 of the type having a front wheel 7 and a rear wheel 9 which tracks the path of the front wheel such as a motorcycle.

The trailer 10 is generally elongate in a forward travel direction of the towing vehicle so as to be arranged to carry elongate cargo items 11 thereon including bicycles, surfboards and the like for example. As described in further detail below, the trailer is supported by hitch connection to the rear end of the towing motorcycle at a front end while being supporting for rolling movement along the ground by a single wheel at a rear end. The rear wheel is supported for steering movement responsive to articulation between the trailer and the towing motorcycle to ensure the single rear wheel of the trailer tracks the motorcycle wheels despite the elongate configuration of the trailer frame which may be near in length or longer than the length of the motorcycle for example. The trailer is also arranged to be foldable for collapsing the overall length thereof when stored.

The trailer 10 includes a trailer frame 12 which is elongate in a longitudinal direction of forward travel between a front end 14 and a rear end 16. The trailer frame includes a main portion comprised mainly of two longitudinal frame members in the form of elongate rails 18 joined parallel and spaced apart from one another at the front ends by a front cross member 20. One or more intermediate cross members are also provided in fixed connection between the two rails at various longitudinally spaced positions.

Each rail 18 includes a front section 22 and a rear section 24 which are pivotally coupled to one another at a central hinge 26. The two front sections remain fixed together and the two rear sections remain fixed together such that the overall front section of the main portion of the trailer frame is pivotal relative to the overall rear section of the main portion of the trailer frame between a working position and a folded storage position in which the overall length in the longitudinal direction is approximately reduced in half. The two hinges 26 define a common hinge axis spaced below the rails 18 in the working position such that the inner ends of the front and rear sections of each rail are arranged to abut one another in the working position and act as a stop to prevent further pivoting movement about the hinge axis from the storage position beyond the working position.

In the working position, the front and rear sections of the two rails all lie in a substantially common horizontal plane. The trailer frame 12 further includes a suspension arm portion 28 pivotally coupled to the rear ends of the rails 18 forming the main portion of the trailer frame. The suspension arm portion is pivotal about a horizontal suspension axis which is oriented perpendicularly to the longitudinal direction of the frame and the forward travel direction of the trailer. In a normal unloaded position of the trailer, the suspension arm portion extends rearward in a generally horizontal common plane with the rails of the main portion of the frame.

The suspension arm portion 28 of the frame includes a front portion 30 which spans laterally across the rear ends of the two rails in pivotal connection thereto. A side portion 32 extends generally rearward from one side of the front portion so as to be laterally offset in relation to the rails. A rear portion 34 extends laterally inward from the rear end of the side portion so as to be substantially parallel and spaced rearward of the front portion. The front portion, the side portion and the rear portion collectively define a generally U-shaped member which defines the suspension arm portion of the frame.

The suspension arm portion 28 further includes a mounting lug 36 fixed to the front portion 30 to project upwardly at a forward inclination. The mounting lug 36 pivots together with the suspension arm portion about the horizontal suspension axis relative to the main portion of the frame. A suspension assembly 38 comprises a linear damper and spring combination so as to be linearly acting as in a conventional suspension member. The suspension assembly 38 is coupled at a first end to the mounting lug 36 and coupled at an opposing second end to the rails forming the rear section of the frame. As increased load is supported on the trailer, the rear end of the suspension arm portion is deflected upwardly relative to the rails into a deflected position such that the mounting lug 36 is pivoted forwardly and downwardly towards the rails to compress the suspension assembly. The suspension assembly is arranged to carry a conventional load for which the trailer is suited with minimal deflection while responding to obstacles in the roadway in the usual manner of a vehicle suspension. The suspension assembly acts to bias the suspension arm portion of the frame from the deflected position back to a normal working position extending generally rearwardly from the main portion of the frame.

A wheel hub 40 is pivotally coupled to the rear end of the rear portion 34 of the suspension arm portion so as to be pivotal relative to the suspension arm portion 28 about a vertical steering axis. The steering axis is arranged to be laterally centered between the frame rails in a common plane with a lateral center of the towing vehicle when travelling in the forward travel direction. A rear wheel 42 of the trailer is supported rotatably on the wheel hub so as to be similarly laterally centered relative to the vertical steering axis of the hub. The hub includes a wheel spindle shaft which defines a horizontal rolling axis of the wheel 42.

A rim portion 44 of the wheel 42 is laterally offset to one side relative to a tire portion 46 supported thereon to ensure that the tire is laterally centered relative to the vertical steering axis so as to be arranged for tracking the path of the wheels of the towing motorcycle when following in a straight path.

The trailer 10 further includes a hitch arm 48, coupled to the front end of the frame. More particularly, the hitch arm includes an axle mount portion 50 in the form of a horizontal shaft which is arranged to be slidably received through the rear wheel axle of the towing motorcycle. The axle mount portion remains pivotal relative to the towing motorcycle about a longitudinal axis of the shaft 50.

In a working position on the rails, the hitch arm includes a front portion 52 extending generally rearward at a downward inclination from one end of the axle mount portion mounted through rear axle of the towing motorcycle. A rear portion 54 of the hitch arm is horizontally oriented to extend rearward at a laterally inward inclination from the rear end of the front portion to a pivot coupling 56 centrally located on the front cross member of the trailer frame.

The pivot coupling 56 is laterally centered relative to the towing vehicle and the trailer frame. Furthermore, the pivot coupling couples the trailer frame to the hitch arm to constrain the relative pivotal movement therebetween about a vertical input axis of the steering mechanism which steers the rear wheel relative to the trailer frame as described in further detail below.

The steering mechanism includes an input crank 58 fixed to the hitch arm at the pivot coupling for pivotal movement together with the hitch arm relative to the trailer frame about the vertical input axis. The input crank extends forwardly at a laterally outward inclination laterally opposite the hitch arm 48 when connected to the towing motorcycle in a straight orientation of the steering mechanism. The steering mechanism further includes an output crank 62 fixed to the hub at the rear end of the suspension arm portion of the frame so as to be pivotal together with the hub relative to the frame about the vertical steering axis. In the straight orientation of the steering mechanism, the output crank is oriented to extend rearward at a laterally outward inclination.

The steering mechanism further comprises a hydraulic linkage coupled between the input crank 58 and the output crank 62 in the form of a first hydraulic actuator 60 and a second hydraulic actuator 64 which are hydraulically connected by suitable hydraulic fluid lines which are flexible and thus readily foldable together with the trailer frame about the central hinge axis while the steering mechanism remains ready in an operative condition.

The first hydraulic actuator 60 is coupled between the front section of the frame and the input crank 58 so as to be arranged to extend and retract linearly in response to pivotal movement of the hitch arm and input crank 58 relative to the frame.

The second hydraulic actuator 64 is mounted between the suspension arm portion of the frame and the output crank 62 at a location spaced radially outward from the steering axis so as to be similarly arranged to linearly extend and retract responsive to pivotal movement between the hub and frame of the trailer.

The input crank and output crank have the same radial distance between their pivot coupling to the respective actuator and the corresponding upright axis of input or output rotation. Also the hydraulic actuators are of the same size and specification while being hydraulically coupled in a closed circuit. Accordingly, an input rotation of the hitch arm in a first direction relative to the trailer frame results in a corresponding equal amount of rotation of the hub relative to the trailer frame in an opposing direction.

For example when the towing vehicle steers to the left from a straight orientation, the hitch arm is pivoted to the left, or counter clockwise about the input axis when viewed from above. In this instance, extension of the first hydraulic actuator results in a transfer of hydraulic fluid between the actuators to cause a corresponding retraction of the second actuator. The output crank and hub connected thereto in turn are rotated to steer towards the right relative to the trailer frame which corresponds to a rotation about the upright steering axis in a clockwise direction when viewed from above. This steering arrangement insures that the trailer follows the same path or arc as the towing motorcycle by discouraging the trailer wheel from cutting across an arc-shaped path of the towing motorcycle and instead follows substantially the same path as the towing vehicle.

To reduce the wear on the motorcycle brakes, and to increase vehicle stability when slowing heavy loads, the trailer wheel is also equipped with a disk brake in cooperation with a brake caliper supported on the hub. The brakes are activated by inertial force between the motorcycle and trailer during deceleration. Hydraulic brake pressure is obtained from a master cylinder fixed to a lever mechanism on the front of the trailer hitch.

In the working position of the trailer, the axle mounting shaft 50 is retained within the rear axle of the motorcycle using a suitable mounting element such as a pin at the free end of the shaft. The rear axle of the motorcycle is thus constrained between the coupling element at the free end of the shaft and the connection of the shaft to the hitch arm at the opposing end of the shaft.

When use of the trailer is no longer desired, the coupling element is removed to permit the shaft to be slidably removed from the rear axle of the towing motorcycle. The hitch arm is permitted to be folded thru a range of approximately 180 degrees by rotating the free end of the input crank towards the actuator. The input crank is similarly rotated through approximately 180 degrees relative to the actuator which causes the input crank to be rotated over centre relative to the first actuator of the hydraulic linkage. The first actuator responds by retracting from a straight position of the rear wheel to an offset steering position at the over center intermediate position of the input crank, and subsequently returns to a substantially straight position once the hitch arm has been folded in overlapping configuration with the front end of the rails in a storage position. Subsequently, the rails are folded in half by displacing the hinges upward relative to the front and rear ends of the rails, which are correspondingly pivoted downward relative to the hinges. The front and rear sections are thus pivoted through a range of approximately 180 degrees relative to one another such that the bottom sides of the rails are substantially abutted in the storage position, with the overall length in the longitudinal direction of the frame being substantially reduced in half.

For subsequent use, the rails are first unfolded and returned to their normal working position in which the inner ends of the rail sections are abutted to retain the rails in the working position when a cargo load is supported thereon. Subsequently, the hitch arm is unfolded and the shaft is mounted through the rear axle of the vehicle for being retained in place using the coupling element as described above.

Figure 10:
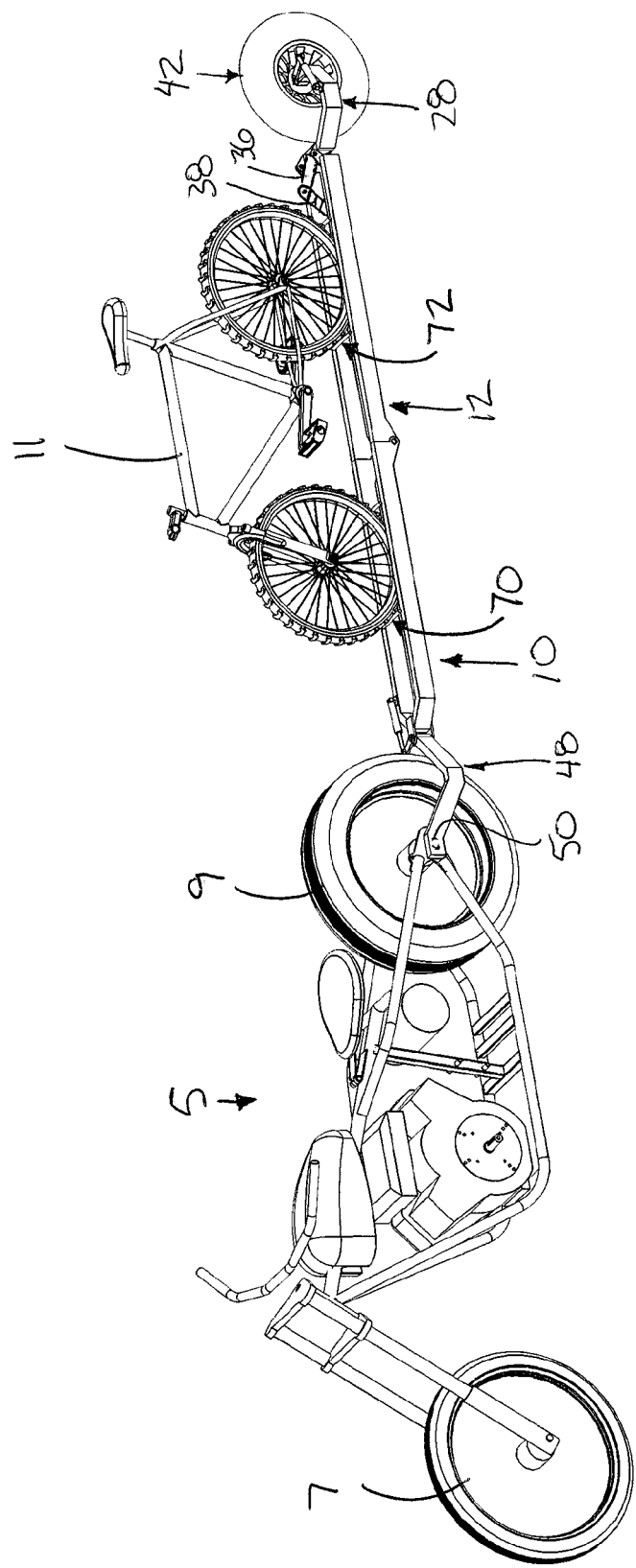
FIG. 10 is a perspective view of the trailer connected to a towing motorcycle and supporting an exemplary elongate cargo item in the form of a bicycle thereon.

Once in the working position various cargo items 11 can be supported on the rails for towing behind the towing motorcycle in a manner which tracks the path of the motorcycle. In the instance of a bicycle as shown in FIG. 10 for example, a front cradle 70 and a rear cradle 72 are provided on respective front and rear sections of the trailer frame to receive the respective front and rear wheels of the bicycle therein. The front and rear cradles are pivotal together with the respective front and rear sections of the trailer frame as the frame sections are folded and unfolded between the working and storage positions. One or more additional supports may extend upwardly from one of the frame sections for latching to the cargo item at a location spaced above the rails for additional support in a transport position. Preferably any upright supports are foldable into a flat condition against the rails in the storage position.

In other instances, when the cargo item comprises a surf board for example, a different configuration of front and rear cradles are preferably supported on respective front and rear sections of the trailer frame for receiving respective longitudinally spaced portions of the surf board therein. Various forms of strapping or additional supports may be provided to retain the surf board within the respective cradles.

In yet further instances various forms of cargo boxes or deck structure may be supported on the top side of the rails for securing cargo thereto using straps and the like.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A trailer for use with a motorcycle to track and lean with the motorcycle as the motorcycle is displaced in a forward travel direction, the trailer comprising:
   a trailer frame which is elongate in a longitudinal direction between a front end and a rear end of the trailer frame;
   a hitch arm extending between a first end arranged to be coupled to the motorcycle and a second end pivotally coupled to the front end of the trailer frame for pivotal movement of the hitch arm relative to the trailer frame about an upright input axis;
   a trailer wheel;
   a trailer hub supporting the trailer wheel thereon for rotation about a horizontal rolling axis oriented in a lateral direction, the trailer hub being pivotally coupled to the rear end of the trailer frame for pivotal movement of the trailer hub and the trailer wheel supported thereon relative to the trailer frame about an upright steering axis which is centered in said lateral direction relative to the trailer wheel; and
   a steering mechanism operatively connected to the hitch arm and the trailer hub so as to be arranged to pivot the trailer hub relative to the trailer frame responsive to pivotal movement of the trailer frame relative to the hitch arm.

2. The trailer according to claim 1 wherein the trailer wheel comprises a rim portion supported on the trailer hub and a tire portion supported on the rim portion, the upright steering axis being centered in the lateral direction relative to the tire portion.

3. The trailer according to claim 2 wherein the rim portion is laterally offset relative to the upright steering axis so as to be arranged to locate a pivotal connection of the trailer hub to the trailer frame within the tire portion.

4. The trailer according to claim 1 wherein the steering mechanism further comprises an input crank fixed relative to the hitch arm adjacent to the input axis, an output crank fixed relative to the trailer hub adjacent to the output axis, and a linkage coupled between the input crank and the output crank.

5. The trailer according to claim 4 wherein the output crank is located within the trailer wheel.

6. The trailer according to claim 4 wherein a length of the input crank between the input axis and a pivotal connection to the linkage is substantially equal to a length of the output crank between the steering axis and a pivotal connection to the linkage.

7. The trailer according to claim 4 wherein the hitch arm is pivotal about the steering axis from a working position extending forwardly from the input axis for connection to the motorcycle to a storage position extending rearwardly from the input axis in overlapping arrangement with the trailer frame.

8. The trailer according to claim 7 wherein the input crank is rotated overcenter relative to the linkage between the working position and the storage position.

9. The trailer according to claim 4 wherein the linkage comprises a hydraulic linkage.

10. The trailer according to claim 1 wherein the trailer frame is foldable about a hinge axis at an intermediate location between the front and rear ends between a working position and a storage position in which an overall length of the trailer frame is reduced relative to the working position.

11. The trailer according to claim 10 wherein the hinge axis is oriented horizontally in said lateral direction.

12. The trailer according to claim 10 wherein the hinge axis is centrally located between the front end and the rear end of the trailer frame.

13. The trailer according to claim 10 wherein the trailer frame comprises at least one longitudinal frame member having a front section and a rear section pivotally coupled at the hinge axis, and wherein the hinge axis is substantially below said at least one longitudinal frame member.

14. The trailer according to claim 13 wherein a rear end of the front section and a front end of the rear section are arranged to abut in the working position so as to prevent pivoting of the front section relative to the rear section from the storage position beyond the working position.

15. The trailer according to claim 10 wherein the steering mechanism is arranged to be foldable about the hinge axis together with the trailer frame while in an operative condition.

16. The trailer according to claim 1 wherein the trailer frame comprises a main portion, a suspension arm portion pivotally coupled to a rear end of the main portion for relative pivotal movement about a horizontal suspension axis, and a suspension assembly coupled between the main portion and the suspension arm portion to bias the suspension arm portion from an angularly deflected position to a normal working position extending generally rearward from the main portion, the trailer hub being supported on the suspension arm portion for pivotal movement about the upright steering axis.

17. The trailer according to claim 1 in combination with said motorcycle, wherein said trailer wheel comprises the only wheel of the trailer and the trailer wheel is supported to track respective wheels of the motorcycle.

* * * * *